United States Patent [19]

Shoden et al.

[11] Patent Number: 5,032,866
[45] Date of Patent: Jul. 16, 1991

[54] ADDITIVE COLOR LAMPHOUSE

[75] Inventors: John Shoden, New Hope; Gary Lakeberg, Mora; Charles Yancey, Minneapolis, all of Minn.

[73] Assignee: Photo Control Corporation, Minneapolis, Minn.

[21] Appl. No.: 491,535

[22] Filed: Mar. 12, 1990

[51] Int. Cl.⁵ ............................................. G03B 27/72
[52] U.S. Cl. ........................................ 355/38; 355/69; 355/77; 355/68
[58] Field of Search .................... 355/68, 69, 77, 38

[56] References Cited

U.S. PATENT DOCUMENTS

| | | | |
|---|---|---|---|
| 3,630,609 | 12/1971 | Clapp et al. | 355/37 |
| 4,004,214 | 1/1977 | Evans | 323/19 |
| 4,050,808 | 9/1977 | Gyori et al. | 355/38 |
| 4,068,943 | 1/1978 | Gyori | 355/38 |
| 4,093,908 | 6/1978 | Evans | 323/19 |
| 4,214,171 | 7/1980 | Gyori | 306/39 |
| 4,371,259 | 2/1983 | Howitt | 355/38 |
| 4,423,953 | 1/1984 | Burnham | 355/38 |
| 4,565,441 | 1/1986 | Evans et al. | 355/38 |
| 4,760,609 | 7/1988 | Tamagaki | 355/69 X |
| 4,935,772 | 6/1990 | Wakui et al. | 355/68 |

OTHER PUBLICATIONS

Hazeltine Product Literature-Date of Publication is Unknown.

Primary Examiner—L. T. Hix
Assistant Examiner—D. Rutledge
Attorney, Agent, or Firm—Merchant, Gould, Smith, Edell, Welter & Schmidt

[57] ABSTRACT

An additive color light source for professional photographic printing is disclosed. The lamphouse has a closed loop light intensity feedback control system for regulating the light sources within the lamphouse.

6 Claims, 5 Drawing Sheets

ADDITIVE COLOR LAMPHOUSE

BACKGROUND OF THE INVENTION

1. Field of the Invention

The present invention relates to an additive color light source for professional photographic printing and more particularly to a lamphouse having a closed loop light intensity feedback control system for regulating the light sources within the lamphouse.

2. Description of the Prior Art

Modern photographic color printing requires a lamphouse which supplies red, green and blue light. Typically, a color printer controller computer or color negative analyzer is used to select the desired amount of red, green and blue light for a particular exposure. The additive lamphouse converts the color computer information into controlled intensity values for each of the colors. Total photographic exposure time and color balance in the final print requires accurate control over the intensity of each of the light sources.

U.S. Pat. No. 4,565,441 to Evans describes a light source for a photographic color printer which utilizes feedback control to regulate the intensity of the lamps. In this prior art device, light is withdrawn from the lamphouse mixing chamber and the color balance is monitored by circuitry which is used to generate error signals. The error signals may be combined with control signals from a conventional color printing processor computer, and used to control the current delivered to the lamps.

U.S. Pat. No. 4,371,259, to Howitt, teaches a digital color printer system in which a microprocessor is used to compute and store various color value and exposure data information for use with an additive color printer.

SUMMARY OF THE INVENTION

In contrast to the additive color lamphouses of the prior art and in order to remedy deficiencies known in such devices, the present invention provides a lamp control system which provides a first linear proportional lamp control system and a second non-linear lamp control system.

In operation, the control system monitors lamp output intensity and compares the measured lamp intensity with a lamp intensity set-point value stored in a microcontroller memory. The difference between the measured intensity value and the set-point intensity value generates a light intensity error value which is compared with a threshold value.

If the error value is below the threshold value, the lamp intensity is controlled by a first proportional power control system which drives the measured lamphouse intensity toward the set-point. If, however, the error signal exceeds the threshold value, then a second nonlinear, non-proportional power control system is invoked which rapidly brings the measured lamp intensity into the control range of the proportional control system.

This improved sequential control methodology permits tighter control over the lamp intensity.

BRIEF DESCRIPTION OF THE DRAWINGS

In the drawings, in which like reference numerals indicate corresponding structures throughout the views.

DETAILED DESCRIPTION OF AN ILLUSTRATIVE EMBODIMENT

In operation, the additive color lamphouse of the present invention is incorporated into a conventional color printer. The color printer provides an optical plane for a photographic negative.

A conventional color computer is used to read the color balance of the negative and to generate set-point and exposure time values which are sent to the additive lamphouse in a conventional fashion.

A microcontroller within the lamphouse uses conventional color computer output code to select appropriate set points for the lamphouse lamp intensities. It is conventional to specify relative light intensity in "cc", where $100 Log10 X = cc$. This nomenclature is used throughout the specification.

Figure 1:
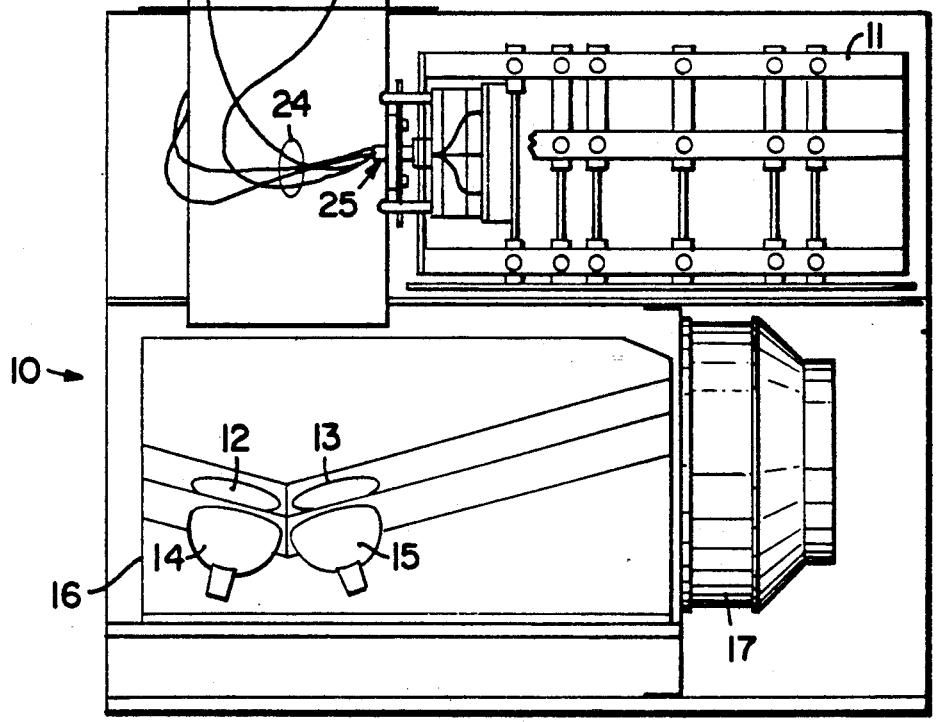
FIG. 1 is a schematic mechanical drawing illustrating the location and relationship between the various lamphouse elements.

FIG. 1 shows the additive color lighthouse in isolation 10. Four lamps 12, 13, 14 and 15 are located within a housing 16. A cooling fan 17 draws cooling air through the housing 16 to cool the lamps.

Light from the lamps is directed to a mixing chamber 18. It is contemplated that the interchangeable mixing chambers of varying sizes will be provided to optimize lamphouse efficiency and performance for the various industry standard film formats.

Multiple reflections from the walls of the mixing chamber 18 and the housing 16 result in a uniform source of illumination projected to the color printer through aperture 19. In operation the actual light output from the lamphouse is measured. This function is performed in connection with the lamp monitor module.

Optical collectors 20–24 are located in the corners of the mixing chamber 18 to collect the light delivered by the lamphouse to the printer. The optical collectors are connected to the lamp monitor module 60 through an optic fiber assembly 24. The module supports a photodiode array 28 which is used to convert incident light into a voltage.

Temperature sensitive electronic components of the lamphouse are contained in a thermally isolated and fan cooled enclosure 11. This enclosure carries the microcontroller module 62, the signal conversion module 61, the lamp driver module 42 and the lamp monitor module 60.

Figure 2:
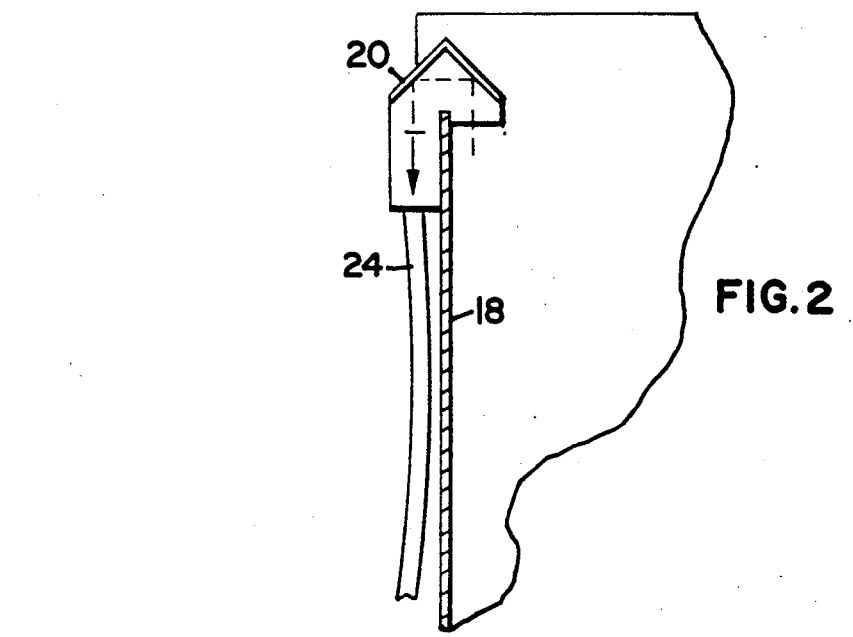
FIG. 2 is a mechanical schematic illustrating an optical element for sampling light from the mixing chamber.

FIG. 2 shows an illustrative embodiment of a light-sampling optical collector 20 suitable for use in carrying out his invention. This optical collector uses a prism 25 to collect light from the mixing chamber 18 and to direct it to an optic fiber bundle 24. The optic fiber bundle transmits the light to the photo sensor assembly 28. The fiber itself 24 provides thermal isolation between the temperature sensitive photo detector assembly 28 and the relatively hot mixing chamber 18. Other approaches may be employed to collect light as well. For example it may be preferable to integrate the light collection structure with the fiber optic bundle itself to eliminate light loss and to make the collector less expensive to manufacture.

Figure 3:
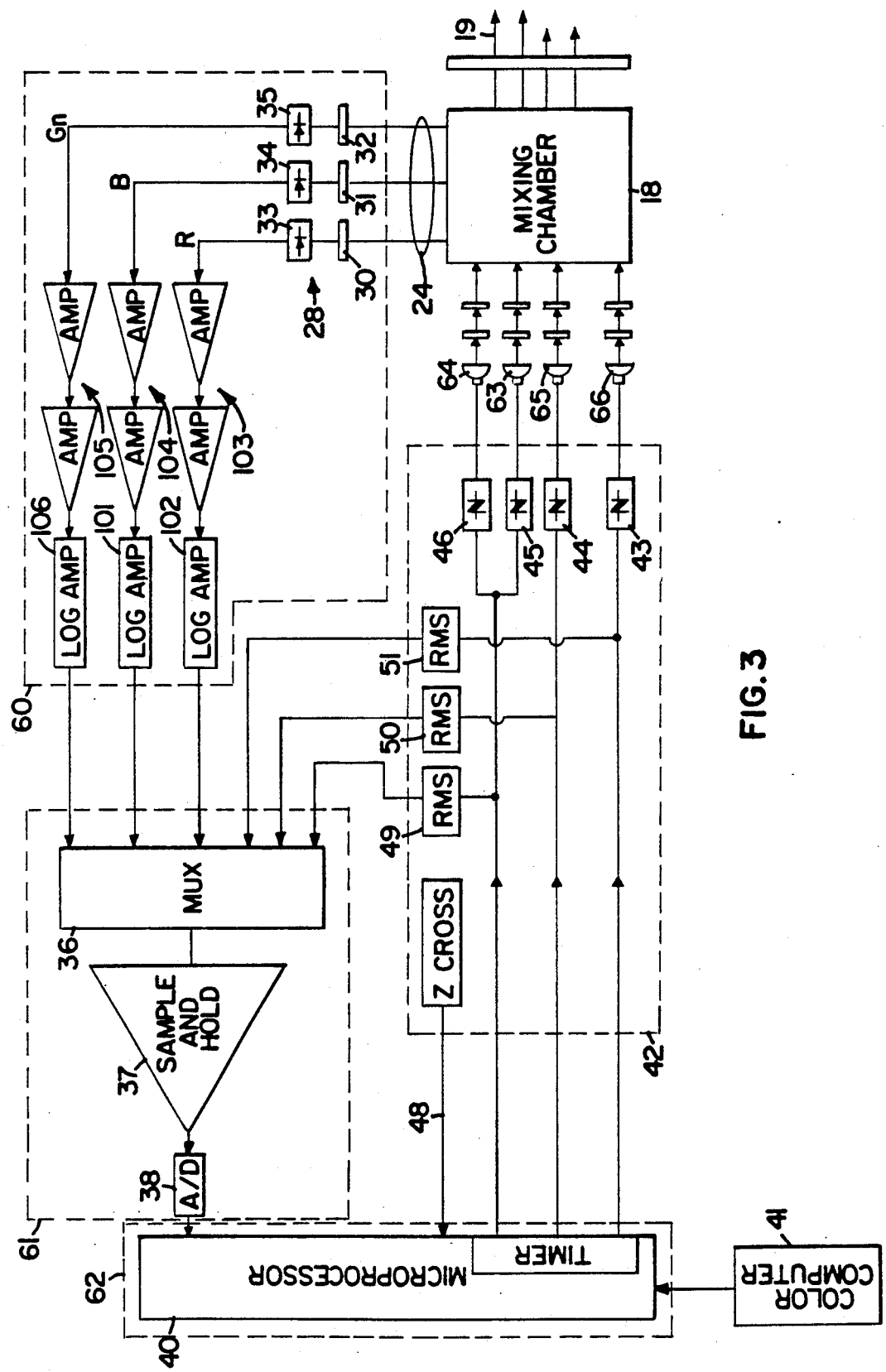
FIG. 3 is an electrical block diagram illustrating the relationship between the major components of the system.

FIG. 3 is an electrical block diagram illustrating the relationship between the major components of the system.

The circuitry is divided into a lamp monitor module 60; a signal conversion module 61; a lamp driver module 42; and a microcontroller module 62.

The lamp monitor module 60 contains photo sensors which preferably take the form of a photodiode array 28. Fiber optic cabling 24 couples the optical collectors 20-23 to the photo sensor array 28. The cable may be split up to selectively distribute light to individual color filters; including green 30, blue 31 and red 32 filters. The light, coupled through the filters, is incident upon photodiodes 33-35, which convert the incident light into a voltage. Since the response of the photo detectors varies over the green-blue region, it is preferred to apportion the cable 24 to result in approximately equal output from the detectors. It is preferred to divide the cable such that so that 10% of the light is directed to red, and 45% is sent to the blue and to the green detectors.

Each photodetector is connected to an amplification and signal conditioning channel. After suitable amplification through an amplifier array 103-105, the incident light intensity data is converted to a log value through log amps 101,102, and 106. These logarithmic amplifiers serve to convert the lamp signal voltage to a corresponding analog "cc" value. It is preferred to perform the cc conversion in the analog domain rather than in software to reduce A to D conversion requirements and to reduce software overhead.

The analog values for log light intensity are coupled to a signal conversion module 61. A multiplexer 36 connects the applied signals to a digitizing circuit comprising a sample and hold 37 circuit and A to D converter 38. Under microprocessor control, the measured values of the incident light are converted into numbers stored within the memory of microprocessor 40 system. The values of the measured intensities are compared with set-point intensities entered into the microprocessor system from a conventional color computer 41. The light intensity data is manipulated under microprocessor control and computations are carried out resulting in a control signal which delivers power to the lamps, thus controlling their intensity.

In general, the microcontroller 40 generates timer data which is used to control the phase angle of the AC lamp drivers 43-46, located in the lamp driver module 42.

It is preferred to use a conventional triac control to supply AC power to the lamp filaments. In general, the computation results in a time-delay signal which is loaded into an integral timer.

In operation, the triacs turn off at the AC zerocrossing. The zero crossing detector then generates an interrupt which is served and which results in the generation of a time delay value for the integral timer. The triacs turn back on after a timed delay from the last zerocrossing. As a consequence power is supplied to the lamps during a timed portion of each AC cycle. In this fashion the timers use microcontroller data to limit and control the amount of power supplied to the lamp during each AC cycle. The lamp driver module 42 also supplies zerocrossing information to the microprocessor via connection 48. The zero crossing are used to set an interrupt flag which is used by the microcontroller in connection with the software routines disclosed in connection with FIGS. 4,5,6. This module also contains circuitry 49-51 which monitors the root mean square values of the current actually supplied to the lamps. The RMS value of power is supplied to the signal conversion multiplexor and may be used in applications where shutters are used to control lamphouse exposure time which deprives the controller system of access to the optically measured lamp intensities.

Figure 4:
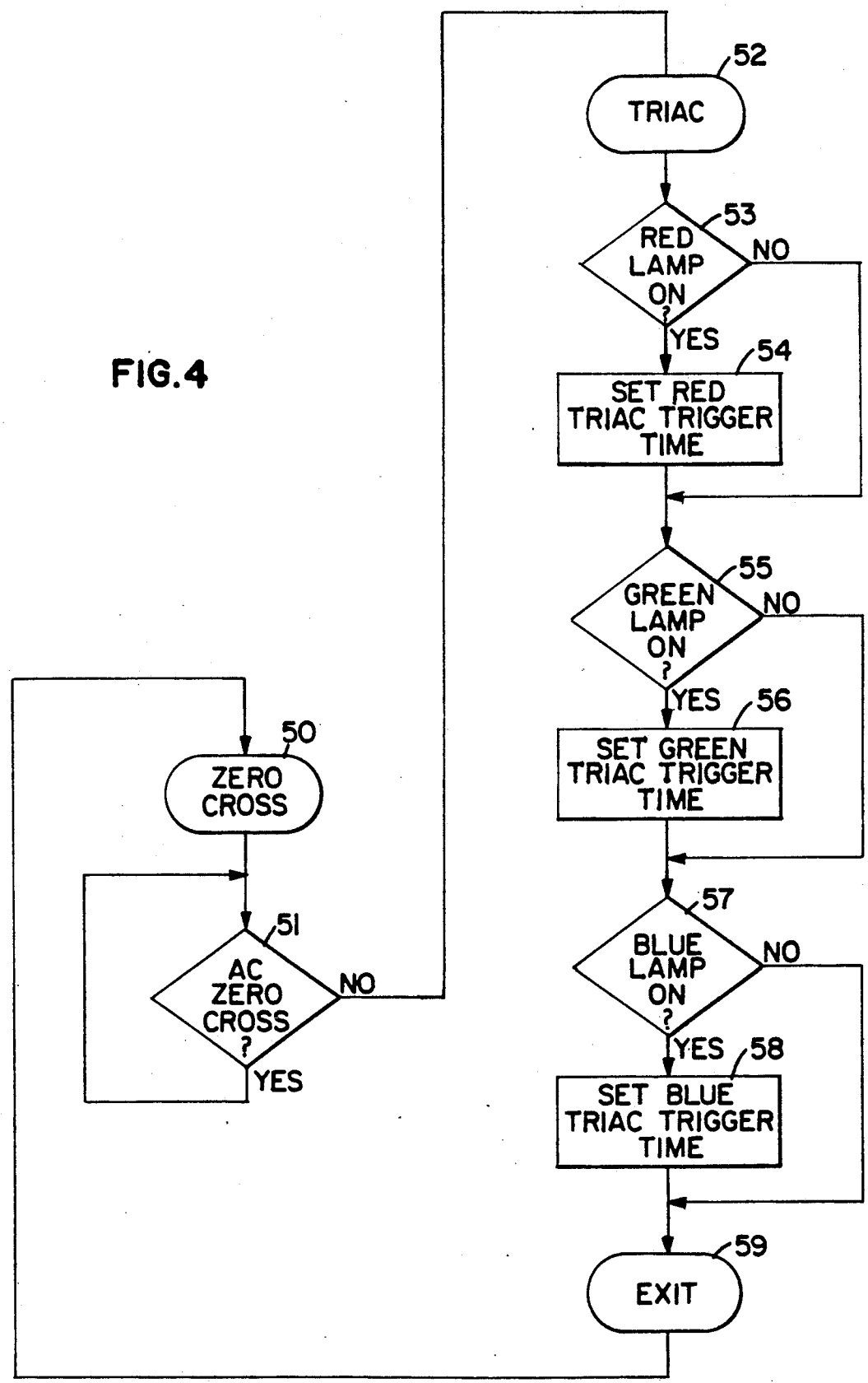
FIG. 4 is a flow chart illustrating the lamp driver control function for the lamphouse.

FIG. 4 is a flow chart diagram illustrating the lamp driver control flow for the lamphouse. Zero-crossing information provided by the power supply module 42 is applied to the microprocessor to initiate the program.

Each zero cross generates an interrupt. Interrupt service 50 begins the control process. At decision block 51 the state of the AC power is tested and if the AC phase angle indicates the availability of power to the lamps then the block 52 is entered. At decision block 53 the state of the red lamps 63 and 64 are tested if the light is on the current value for the red lamp time is read from the microcontroller memory and loaded into the timer associated with the triac power controller 46 at block 54. The timer then times out the appropriate phase angle for the lamp. If the red lamps are off then program flow is directed to the decision block 55, where the state of the green lamp 66 is tested. If the green lamp is on the current value for the phase angle duration time for the green lamp is loaded from the microcontroller memory into the timer to control the green triac power controller 43 at block 56. If the green lamp is not on then control flow is directed to the decision block 57. If the blue lamp is not on then program flow is directed to block 59. If the blue lamp 65 is on, the current computed value for the AC phase angle duration for the blue lamp is loaded into the timer of the triac power controller 44. In this fashion the phase angle duration of each lamp is controlled in sequence to regulate the amount of power supplied to each lamp and to therefore control its intensity.

Figure 5:
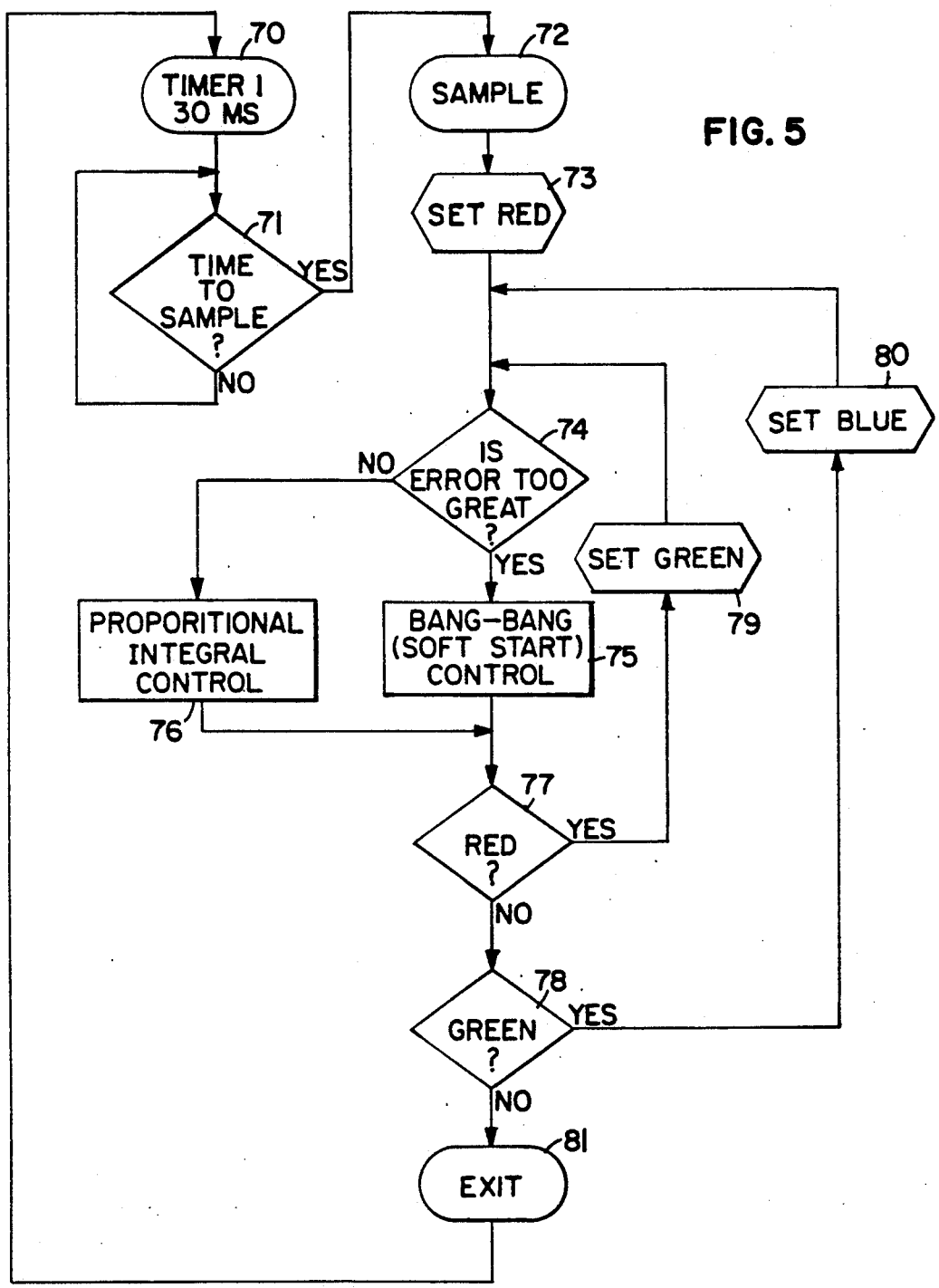
FIG. 5 is a flow chart illustrating the selection process between the proportional integral control and the soft start control sequences.

FIG. 5 is a flow chart illustrating the selection process between the proportional integral control and the soft start or bang-bang control sequences.

The logic flow for the intensity sampling routine is interrupt driven at a fixed interval set by a timer. The timer sets an interrupt flag at block 70 every 30 milliseconds. Once the timer interrupt initiates the program, at block 70, the decision block 71 directs flow to the block 72.

At block 72 selects the microprocessor selects the appropriate multiplexor 36 connection to sample, hold and digitize the output of the log amp 102 which corresponds to the red channel.

In operation, block 73 corresponds to the measurement of light output in the red portion of the spectrum and the digitization and storage of the actual measured intensity value in the memory of the microcontroller 40.

After storing the measured red value, program flow is directed to decision block 74. At this point the stored value of the measured intensity value for the red channel is compared with the preset value for red value prescribed by the color computer 41 to generate an error value. The computed error value is then compared to a threshold value to direct program flow to either the block 76 or the block 75.

After the appropriate control blocks 76 or 75 is selected for "red" lamp control, the program is directed to decision block 77 where the control process for the red lamp is completed and the control process for the other colors is initiated. At this point the green and blue lamps are treated in an identical fashion to the process described for the red lamps. At the conclusion of the control process the program flow exits the routine at block 81 to await the occurrence of the next timer interrupt 70.

Figure 6:
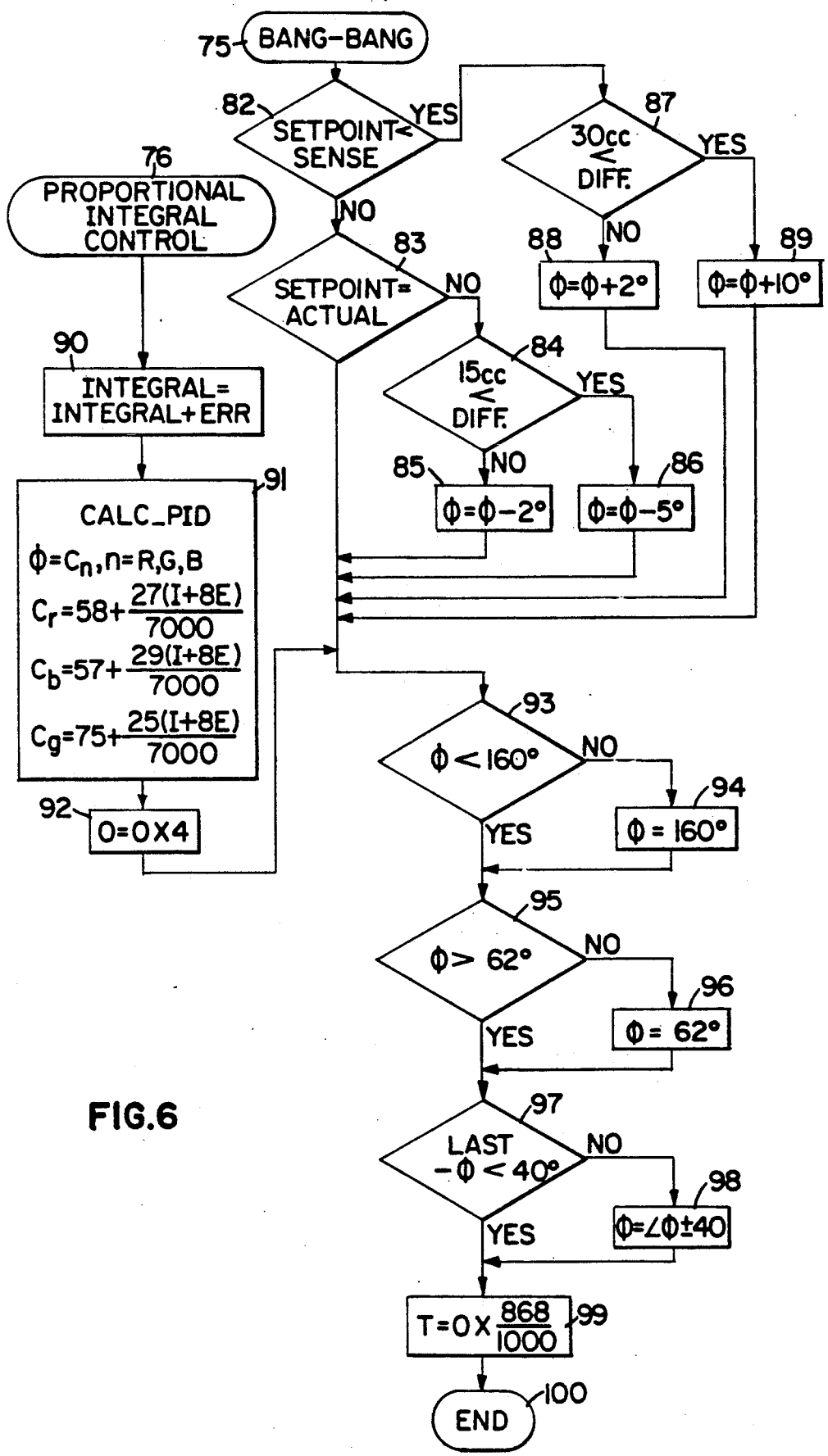
FIG. 6 is a flow chart illustrating the proportional integral control and soft start control sequence.

FIG. 6 is a flow chart illustrating the proportional integral control and soft start control sequence.

Bang-bang control is entered at block 75. Program flow proceeds to decision block 82 where the measured color value is compared to the color setpoint value. If the measured value of color intensity exceeds the setpoint program flow is directed to decision block 87 where the magnitude of the difference is compared to a value corresponding to 30 cc's. If the difference is greater than 30 cc then the program flow is directed to block 89 where the phase angle time is increased by a fixed value which is 10 degrees in the illustrative embodiment. If the difference is less than 30 cc then the program flow is directed to block 88 where the phase angle time is increased by a fixed value which is 2 degrees in the illustrative embodiment. These paths are used for incremental and discrete reduction of the lamps intensity if they are too bright. Although a greater number of discrete steps could be used, two increments have been found to be sufficient. The maximum values of these step values is selected based upon lamp inrush current limitations.

If the measured value is below the setpoint value for the particular color then the program flows to decision block 83. At this point in the program, if the error value equals the setpoint the program flow is directed to decision block 93. However if the error value is greater than the threshold value then program flow is directed to the decision block 84 where the magnitude of the error is compared with an intensity value of 15 cc. If the disparity is greater than 15 cc then the phase angle time is decreased by 5 degrees at block 86. If the disparity is less than 15 cc then the phase angle is decreased by 2 degrees at block 85. Blocks 93 through 98 test the computed value for phase angle to insure that it is within range. If the computed value is out of range a value for the phase angle is asserted to insure that the lamp receives sufficient power to remain illuminated to permit feedback control. Typically program flow is directed directly to block 99 where the timer trigger time is computed by multiplying the phase angle by a factor of 0.868. At block 100 the program flow halts with the time value for the particular lamp computed according to the procedure and stored as a parameter in memory.

If proportional control of the lamps is required by the program of FIG. 5 then the program enters at block 76. At block 90 the integral value for the current is computed. Depending upon the lamp color, the difference between the lamps measured output and its setpoint is added to the current integral to give the new integral value. In block 91 this new integral value is multiplied by an appropriate scale factor. The illustrative scale factor values 27,29 or 25 for red green or blue accommodate the spectral output variations of the lamps.

The result of the computation is a phase angle which is used to drive the triac power controller. Program flow reenters the program above decision block 93 and the testing routine checks the computed value for the phase angle for their appropriateness.

What is claimed is:

1. Color lamphouse apparatus for photofinishing comprising:
   lamp means for generating light in response to an applied voltage;
   enclosure means including walls, for locating, retaining, enclosing said lamp means;
   light intensity monitoring means responsively coupled to said enclosure means for monitoring the intensity of said lamp means and for generating a lamp intensity signal indicating the intensity of said light;
   intensity comparison means for comparing said lamp intensity signal to a lamp intensity setpoint signal and for generating a light intensity error signal;
   power selection means for comparing said intensity error signal to a threshold signal for generating a first power select signal when said intensity error signal is below said threshold signal, and for generating a second power select signal when said intensity error signal exceeds said threshold signal;
   first power selection means responsive to said first power select signal for generating a first applied voltage which is substantially linearly proportional to said error signal, the first applied voltage being iteratively varied by incremental gradations having a first magnitude, whereby the lamp light approaches said setpoint;
   second power selection means responsive to said second power select signal for generating a second applied voltage which is a step function of said error signal, the second applied voltage being iteratively varied by incremental gradations having a second magnitude, the second magnitude being greater than the first magnitude, whereby said lamp light approaches said setpoint.

2. The apparatus of claim 1 wherein said light intensity monitoring means comprises:
   optical collector means, adapted for mounting proximate said walls of said enclosure means, for collecting light from said enclosure means;
   fiber optic means coupled to said optical collector means for transmitting light energy from said optical collector means;
   photo detector means, connected to said fiber optic means for converting transmitted light energy into an electrical signal corresponding to light intensity data.

3. The color lamphouse apparatus of claim 2 wherein the step function further comprises:
   A. a first step size, the first step size being utilized when the intensity error signal exceeds a first relative light intensity; and
   B. a second step size, the second step size being utilized when the intensity error is less than the first relative light intensity.

4. The color lamphouse apparatus of claim 3, wherein the first relative light intensity is equal to thirty.

5. The color lamphouse apparatus of claim 4, wherein the photodetector means comprises:
   A. a first photodetector, the first photodetector being sensitive to blue light, the first photodetector receiving approximately 45% of the light energy transmitted by the fiber optic means;
   B. a second photodetector, the second photodetector being sensitive to green light, the second photodetector receiving approximately 45% of the light energy transmitted by the fiber optic means; and C. a third photodetector, the third photodetector being sensitive to red light, the third photodetector receiving approximately 10% of the light energy transmitted by the fiber optic means.

6. A method of controlling lamps in an additive color lamphouse comprising the steps of:

A. turning on said lamp,

B. monitoring the light intensity of said lamp, to generate a light intensity signal;

C. comparing said light intensity signal with a light intensity setpoint value to generate an error value;

D. comparing said error value with a threshold value to generate a power select value;

E. selecting a first lamp turn off time value proportional to said error value when said power select value is below said threshold value, the first turn off time value being varied iteratively by steps having less than a first duration;

F. selecting a second discrete lamp turn off time value when said power select value is above said threshold value, the second discrete lamp turn off time value being varied iteratively by steps having a second duration, the second duration being greater than the first duration; and G. turning off said lamp at the expiration of said time value.

* * * * *

UNITED STATES PATENT AND TRADEMARK OFFICE
CERTIFICATE OF CORRECTION

PATENT NO. : 5,032,866

DATED : July 16, 1991

INVENTOR(S) : Shoden, et al.

It is certified that error appears in the above-identified patent and that said Letters Patent is hereby corrected as shown below:

```
Col. 1, line 58, "nonlinear" should read --non-linear--.
Col. 3, line 4, insert --,-- after the word "example".
Col. 3, line 26, delete "such that" after the word "cable".
Col. 3, lines 60 and 61, "zerocrossing" should read --zero-crossing--.
Col. 3, line 61, "zerocrossing should read --zero-crossing--.
Col. 4, line 3, "are" should read --is--.
Col. 4, line 2, "zero cross" should read --zero-cross--.
Col. 4, line 18,     corrected "zero cross" should read --zero-cross--.
Col. 4, line 53, delete "selects" after the numeral "72".
Col. 5, line 15, "setpoint" should read --set-point--.
Col. 5, line 20, "30cc" should read --30cc's--.
Col. 5, line 23, "30cc" should read --30cc's--.
Col. 5, lines 34 and 37, "setpoint" should read --set-point--.
Col. 5, line 37, "setpoint" should read --set-point--.
Col. 5, line 38, insert --,-- after the word "However".
Col. 5, lines 41 & 42, "15cc" should read 15 cc's--.
Col. 5, line 44, "15 cc" should read --15 cc's--.
Col. 5, line 53, "0868" should read --.868--.
Col. 5, line 60, "setpoint" should read --set-point--.
Col. 5, line 64, insert --,-- after the word "red".
Col. 5, line 68, "reenters" should read --re-enters--.
Col. 6, claim 1, line 16, "setpoint" should read --set-point--.
Col. 6, claim 1, lines 16, 30 and 38, "setpoint" should read --set-point--.
```

UNITED STATES PATENT AND TRADEMARK OFFICE
CERTIFICATE OF CORRECTION

PATENT NO. : 5,032,866
DATED : July 16, 1991
INVENTOR(S) : Shoden, et. al.

It is certified that error appears in the above-identified patent and that said Letters Patent is hereby corrected as shown below:

Col. 7, claim 6, "setpoint" should read --set-point--.

Signed and Sealed this

Twenty-third Day of February, 1993

Attest:

STEPHEN G. KUNIN

*Attesting Officer*     *Acting Commissioner of Patents and Trademarks*